United States Patent [19]
Tillison, Sr.

[11] Patent Number: 5,577,375
[45] Date of Patent: Nov. 26, 1996

[54] LAWN DE-THATCHER

[76] Inventor: Andrew T. Tillison, Sr., Rte. 1, Box 36, Wellston, Okla. 74881

[21] Appl. No.: 413,596

[22] Filed: Mar. 30, 1995

[51] Int. Cl.⁶ .................................................. A01D 34/47
[52] U.S. Cl. .............................. 56/17.5; 56/256; 56/504; 56/DIG. 20; 172/28
[58] Field of Search ............................... 56/17.5, 16.4 R, 56/502, 504, 256, DIG. 13, DIG. 17, DIG. 20; 172/21, 27, 28, 19

[56] References Cited

U.S. PATENT DOCUMENTS

| | | |
|---|---|---|
| 2,836,023 | 5/1958 | Caldwell . |
| 2,902,813 | 9/1959 | Brady . |
| 2,923,117 | 2/1960 | Henderson . |
| 3,021,661 | 2/1962 | Couberly . |
| 3,093,951 | 6/1963 | Barows et al. . |
| 3,102,376 | 9/1963 | Henderson . |
| 3,292,353 | 12/1966 | Woodring et al. . |
| 3,397,525 | 8/1968 | Woodring . |
| 3,452,823 | 7/1969 | Shapland, Jr. ............................. 172/21 |
| 3,604,188 | 10/1969 | Mott ......................................... 56/294 |
| 3,606,748 | 9/1971 | Middlesworth . |
| 4,615,395 | 10/1986 | Nagamine .................................. 172/91 |
| 5,056,304 | 10/1991 | Jacobsen ................................. 172/21 X |

Primary Examiner—Terry Lee Melius
Attorney, Agent, or Firm—Head, Johnson & Kachigian

[57] ABSTRACT

A lawn care apparatus combining mowing, de-thatching, and mulching action with improved grass clippings and thatch removal characteristics, designed for operation over various types of lawn or turf, where the cutting assembly consists of a shaft with a plurality of readily replaceable blades mounted radially about the shaft which itself is mounted on the apparatus housing and rotating about a horizontal axis transverse to the direction of travel of the apparatus. The rotation of the cutting assembly being in the opposite direction to the rotation of the wheels of the apparatus. The housing designed to curve conformably near the outside edge of the blades over the top portion of the cutting assembly providing for improved gathering action for the grass clippings and thatch into a container attached to and removable from the apparatus. The apparatus having a power means mounted thereon to provide for rotation of the cutting assembly and propulsion of the apparatus.

6 Claims, 6 Drawing Sheets

LAWN DE-THATCHER

BACKGROUND OF THE INVENTION

Field of the Invention

The present invention relates to a multi-purpose device useful in lawn and turf care. Proper lawn maintenance requires mowing and periodic de-thatching. There are currently available mowers of various types both self-propelled and push mowers as well as larger riding mowers. These mowers use rotary cutters or radial blade cutters. Also available are de-thatching, machines. Conventional mowers provide for discharging the cut grass or for collecting same in bags attached to the mowers.

With present equipment when the turf maintenance regimen requires de-thatching, the procedure is to push a de-thatcher over the lawn. Said procedure leaves the thatch on the lawn and manual raking of the thatch is required in order to bag and remove same. Lastly the lawn is mowed to the desired height using available bagging lawn mowers, which may also pick up some of the thatch not raked. The above described procedure is labor intensive. This invention describes a multi-purpose mower and de-thatcher which is designed to accomplish the above described separate functions simultaneously in one pass over the lawn.

Most current designs are equipped with specially designed heavy duty blades for cutting or thatching depending on the implement. The blades require sharpening from time to time in order to obtain maximum efficiency of operation. The current invention provides for economy disposable blades together with a quick replacement means, thus reducing both equipment cost and labor in maintaining said equipment.

Not only does the current invention serve the multiple purpose of mowing and de-thatching, but due to its specially designed cutting means and its improved method of gathering the cut grass, the device will also serve as a mulching lawn mower, picking up leaves and small branches such as are common on lawns in the proximity of trees.

An object of the present invention is to provide a combination mowing and de-thatching as well as mulching apparatus in which the cutting blades are mounted radially on a rotating shaft. The rotation of the shaft on which the cutting blades are mounted is opposite the rotation of the wheels of the apparatus, such that the thatch and grass clippings are picked up and blown over the cutting mechanism and into a removable container provided therefor. The apparatus thus performs in one pass, the lawn maintenance tasks of de-thatching, mowing, raking and gathering.

Another object of the invention is to provide a combination mowing and de-thatching apparatus of the type described which is equipped with disposable blades. The cutting shaft has a plurality of blade mounting arms being interspersed radially. Radially outward ends of each of the mounting arms are equipped with mounting means on which a plurality of disposable blades are attached such that they extend radially from the rotating shaft in line with the blade mounting arms. The outer two blades being bent outwardly to mow grass while the center blade de-thatches, the combination of all the blades and the rotation of the shaft also creates the mulching action.

The multiple purpose is achieved by the unique removable blade assembly, which includes the three disposable free-swinging blades. The straight central blade, extends to reach into the turf and de-thatches the turf while the two outside blades, one on either side of the central blade are bent outwardly and remain above ground level as the shaft rotates, and these two blades cut the grass at the desired height. By proper positioning of the removable blade assemblies both axially and radially along the shaft, the grass is cut over the full width of the cutting path i.e. the length of the shaft, while the grass is simultaneously de-thatched at appropriate intervals.

The shaft is designed to rotate in a direction opposite to the motion of the mower de-thatcher. This combination results in lifting the cut grass and thatch up and over and into a removable collecting container provided. The combination mower de-thatcher is designed such that the cutting area and bagging area are all enclosed for both safety and for the collection of cut grass and thatch and other particles as the machine is operated over the lawn.

The rotating shaft together with the blades is protected by an enclosure. Said enclosure serves to protect the operator and any bystanders from debris which may be picked up during the operation of the apparatus. An object of the invention is the design of the tolerance within which the enclosure fits over the rotating blade assembly. The design is such to promote the gathering of the cut grass and thatch into the receptacle provided, while at the same time avoiding build up of cut grass residue on the inner surface of the enclosure as is common on existing mowers. This self-cleaning feature avoids the further labor-intensive task of periodically cleaning the inside of the existing mower enclosures which is particularly troublesome when cutting wet or dew moistened lawns.

Another object of this invention is a one-step method for adjusting the height at which the lawn is to be cut, thus obviating the necessity of adjusting each of the four wheels as is common in presently available mowers.

DETAILED DESCRIPTION OF THE PREFERRED EMBODIMENTS

Figure 1:
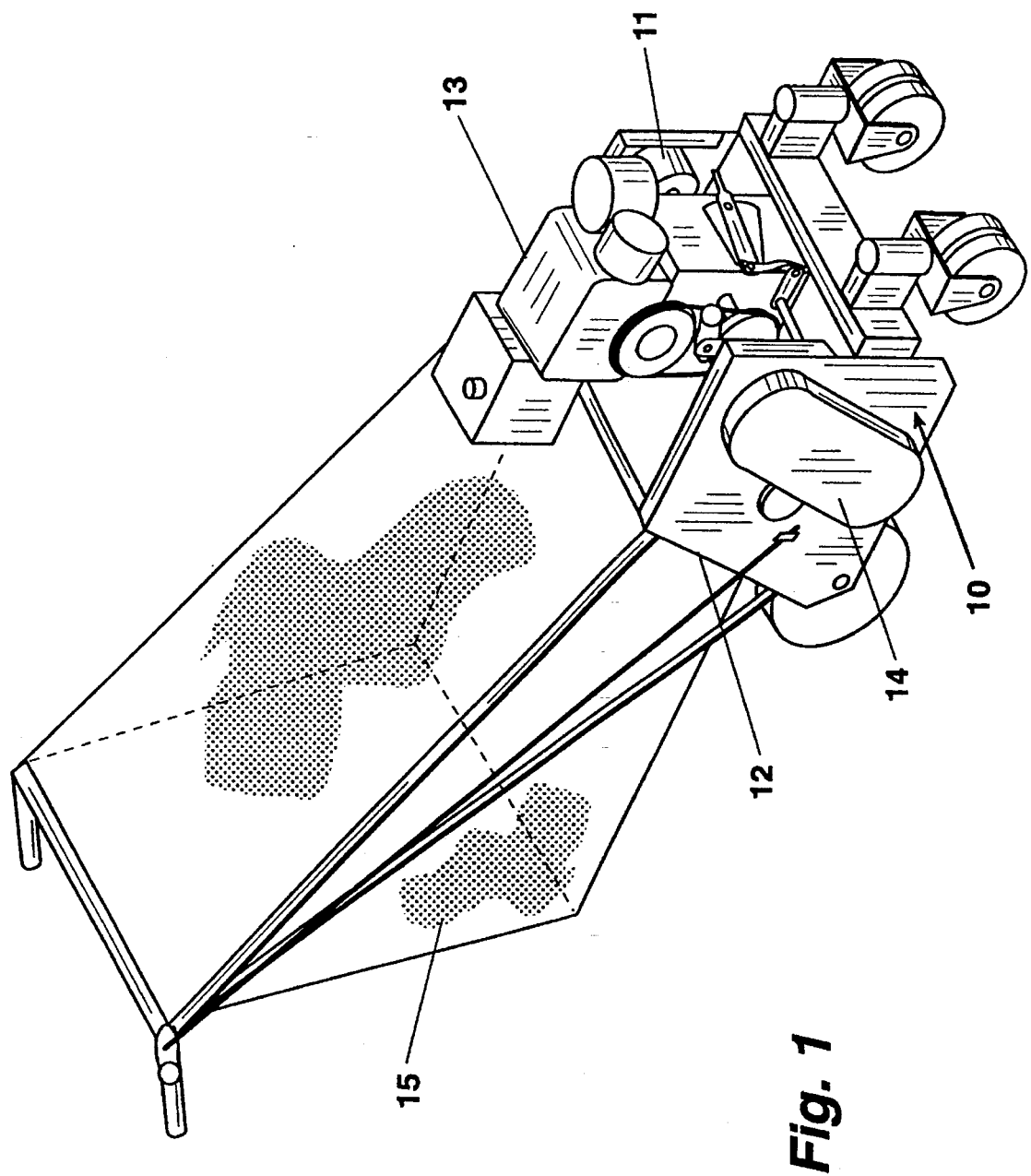
FIG. 1 shows a perspective external view of the combination mower de-thatcher with mulching action embodying the invention.

FIG. 1 shows an external view of the assembled combination mower de-thatcher. The cutting assembly is enclosed inside the enclosure 10 which has an opening in the rear 12 to which is attached the grass catcher 15. The enclosure serves also as a frame for the implement. An engine 13 is mounted on top of the enclosure 10 and is used to drive the cutting assembly via a belt drive 14. The engine also powers a hydrostat 11 which is used to drive the wheels that propel the implement across the lawn.

Figure 2:
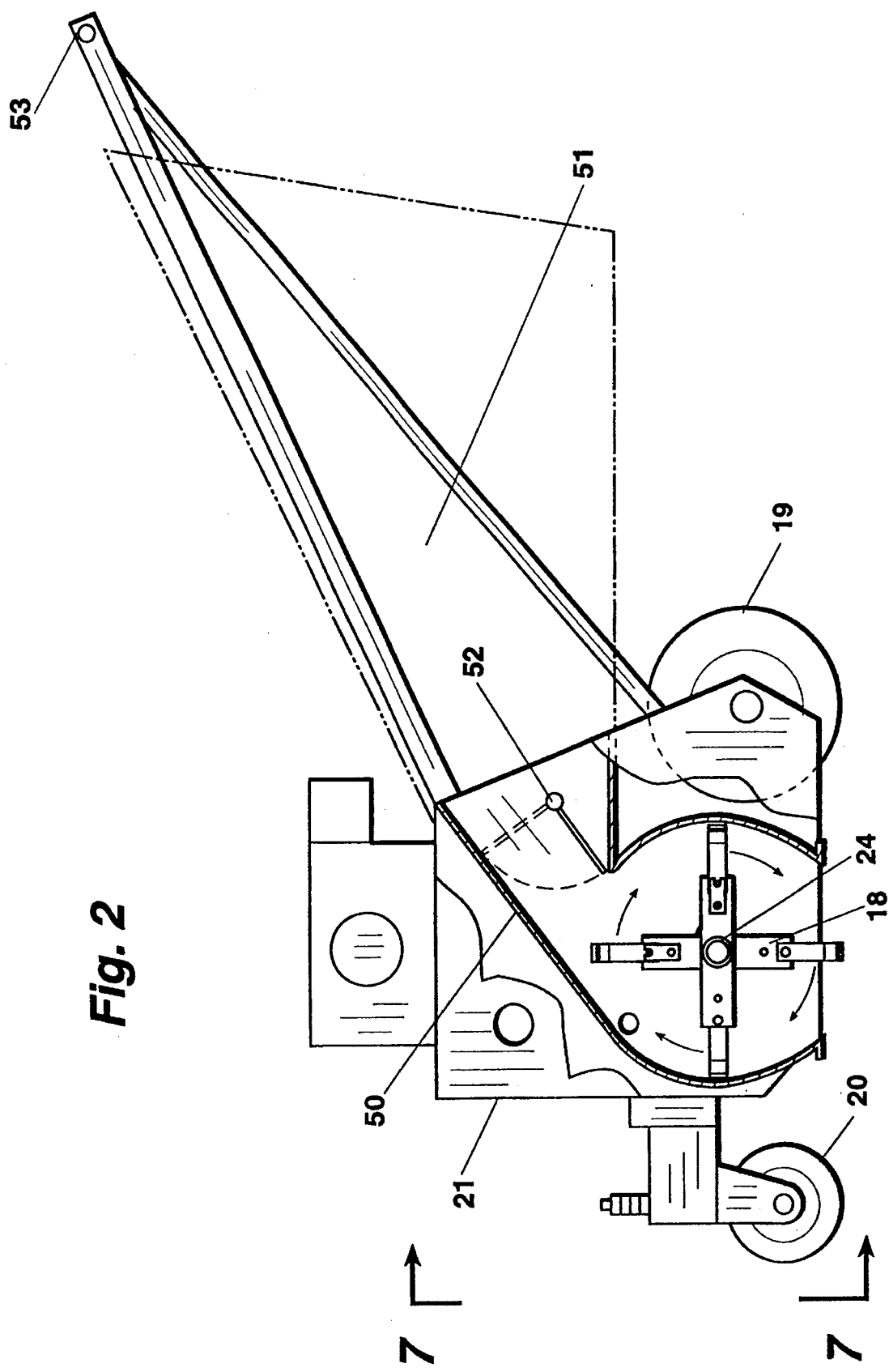
FIG. 2 is an exposed view from the left side showing the reel or rotating shaft with the blades attached to the blade supports, with the left enclosure cover partially removed.

The reel type cutting assembly which contains the blades, extends the full width of the apparatus. FIG. 2 shows the cutting assembly 18, with the left side covers removed. The rear wheels 19 are connected via a transmission (hydrostat) to the engine and provide the means for propelling the apparatus. The cutting assembly is designed to rotate at a relatively high speed, about 3600 r.p.m. The depth of cut may be controlled by adjusting the height of the front wheels 20, with respect to the enclosure 10.

Figure 3:
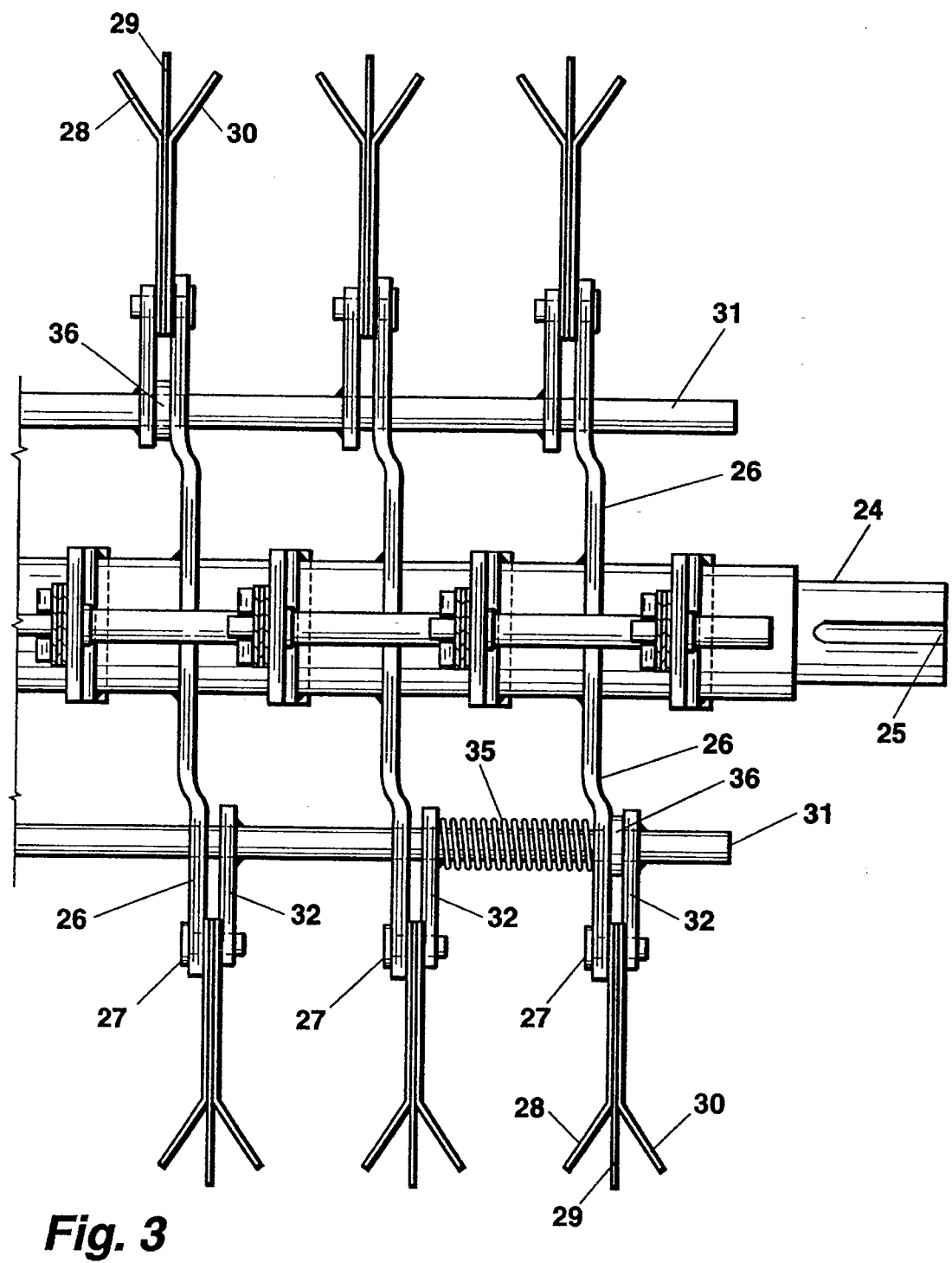
FIG. 3 is the right end of the cutting reel assembly from the front view.

The cutting assembly consists of a shaft 24 which is mounted on its ends and may be rotated. The rotation of the cutting assembly is designed to be in a direction opposite to the rotation of the wheels. The shaft ends are supported by bearing assemblies at each end. These bearings are attached to the frame of the apparatus by standard means. FIG. 3 shows the right end of the cutting assembly. As shown in FIG. 3 one end of the shaft 24, which in the preferred embodiment is a solid metal shaft, has a keyway 25 for securing, a drive pulley and belt connecting the shaft to the engine.

Figure 5:
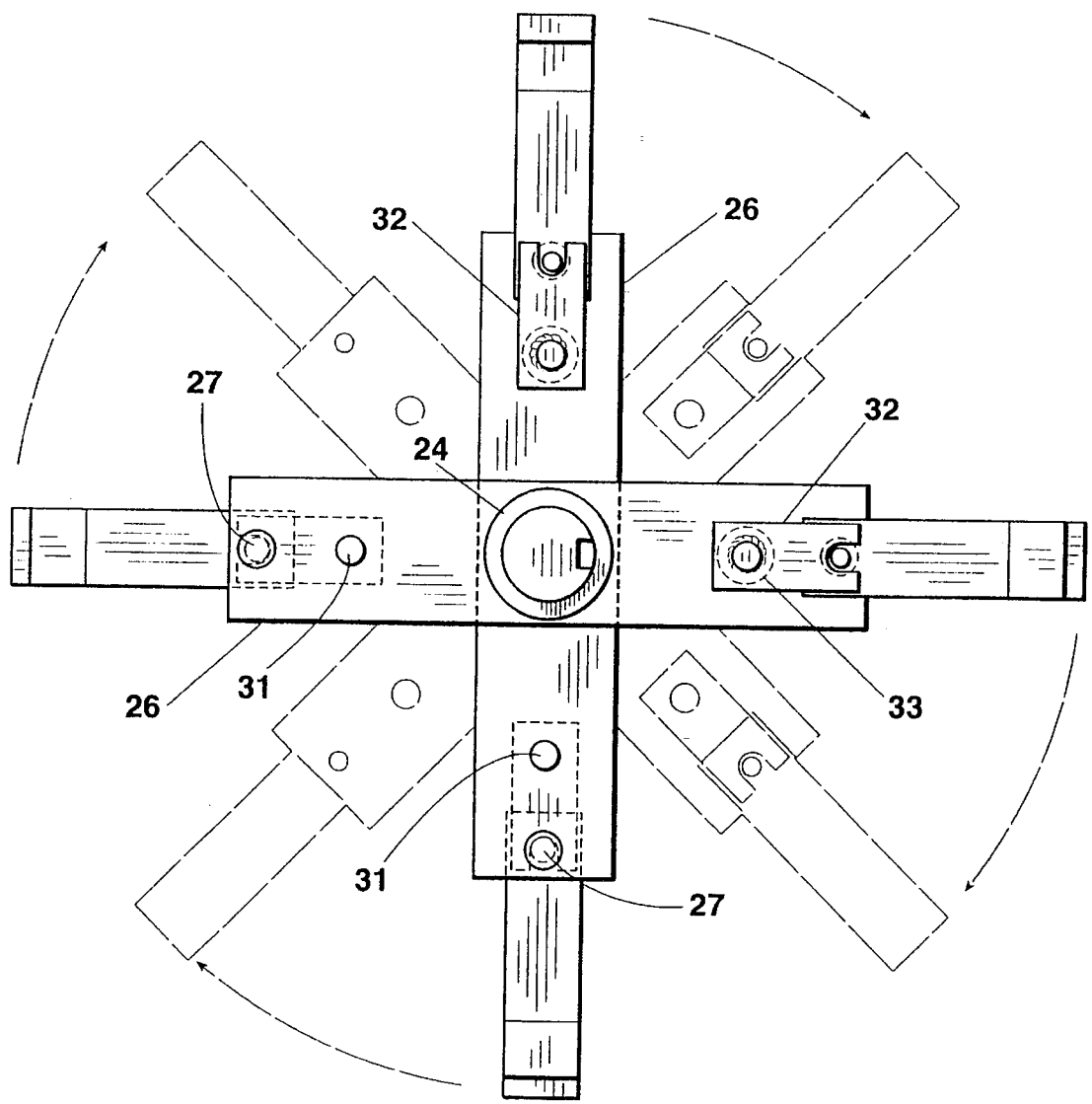
FIG. 5 is an end view of the cutting reel assembly.

Along the length of the shaft 24, cutting blade supports 26 are attached. These supports are spaced longitudinally along the length of the shaft and radially at opposite sides of the shaft or the supports may be of one piece construction extending radially to both sides of the shaft. Thus from the end view as shown in FIG. 5 the blade supports 26 are at 90° from each other in the preferred embodiment, although other symmetrical positions may be used.

Figure 4:
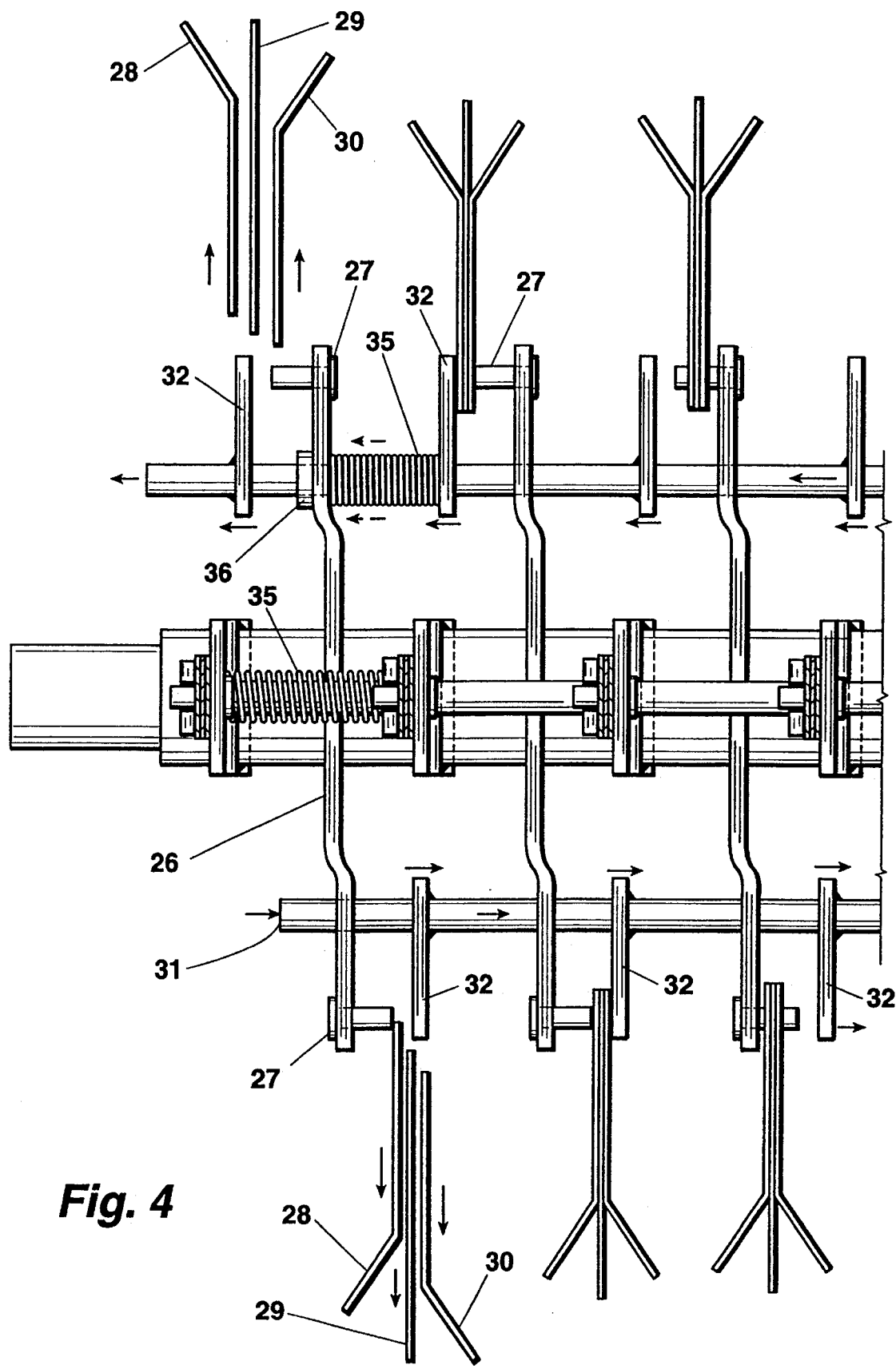
FIG. 4 illustrates the removal of the blades from the cutting reel assembly.

At the radially outward end of each blade support is a pin 27, whose axis is perpendicular to the blade support. The cutting blades 28, 29 and 30, as shown in FIGS. 3 and 4, are mounted on the pins through holes provided on the blades. There are three blades to each blade support, the first 28, being bent outwardly at an angle of about 45°, the middle 29 being straight, and the third 30 being bent outwardly at an angle of about 45° in a direction opposite to that of the first blade. The three blades thus appear as the letter Y from the front view of the apparatus with a line through the middle of the top portion of the Y.

In order to secure the cutting blades to the blade support pins, there is provided a separate rod 31, as shown in FIGS. 3 and 4, which extends approximately the full length of the rotatable shaft 24. Along the length of the rod, at the same intervals as the blade supports, there are attached securing lugs 32. These lugs are designed with a U shaped indent at their radially outward end which will fit over the pins 27 attached to the blade supports 26. The plan view of said lugs is shown in FIG. 5. The blade locking rod 31 passes through holes 33 in the blade supports which are provided therefore and located about one inch from the radially outward end of the blade support. As shown in FIG. 4 a spring 35 is installed at one end of the rod between a blade support and the next longitudinally mounted securing lug. When assembled the spring acts to keep the securing lug over the pins 27 and prevents the blades 28, 29 and 30 from falling off the pins 27.

In the preferred embodiment the blades are mounted in such a way that they are free to rotate about the blade support pin. To achieve this objective, spacers 36 somewhat thicker than the cumulative thickness of the three blades are mounted on the securing rod 31 between the blade support 26 and its securing lug 32.

As the preferred embodiment of the cutting assembly has the blade supports mounted at 90°, four securing rod assemblies are required.

In operation the blades which are bent outward will cut and mulch the grass, and their location is such that adjacent blades assemblies will overlap the cutting swath such that the entire length of the shaft forms the mower de-thatcher cutting swath. The straight blades perform the de-thatching action.

"In the preferred embodiment the length of the blade portion, at an angle of 45°, from the vertical, forms the cutting portion of the blade. At first glance it would appear that such a position for the cutting blade would result in an irregular wave type or cerrated lawn. Due to the radial spacing of blades, about the shaft any given area of lawn will be cut not by one but rather by a plurality of blades in each rotation of the shaft. In this manner the cerration is minimized and the lawn is cut smoothly.

The length of the blade at an angle is approximately one inch, thus cutting above seven-tenths of an inch swath would also result in a variation in depth of cut of seven-tenths of an inch over the swath width. Due to the four radially spaced blade assemblies, the same seven-tenths of an inch swath will be overlapped in part by each of three following blades for each rotation, the effective result being a variation of less than one-quarter inch in the depth of cut over the width of the swath".

The blades are preferably made of thin spring steel such as package banding material. No sharpening is required as the relatively high speed of rotation will provide effective cutting action. The blades will suffer wear over heavy use and may be turned to expose the opposite or unworn side. Replacement of the blades is recommended when both cutting edges are worn down.

As shown in FIG. 4, to remove or replace blades pressure is applied to compress the spring 35 allowing the securing lugs 32 to come off the pins 27, the securing rod may be turned about its longitudinal axis and the blade securing lugs removed. The blades may then be accessed for easy rotation, to utilize their unused cutting edge or for replacement as appropriate. The center or straight blades 29 may be removed to remove the de-thatching action, or some of the center blades may be removed if less de-thatching is more appropriate for the particular lawn. In the preferred embodiment all the blade assemblies secured by one securing rod are released at once thus reducing the time to replace blades. With installation of means coupling the plurality of securing rods, all blades could be loosened in one step.

Figure 6:
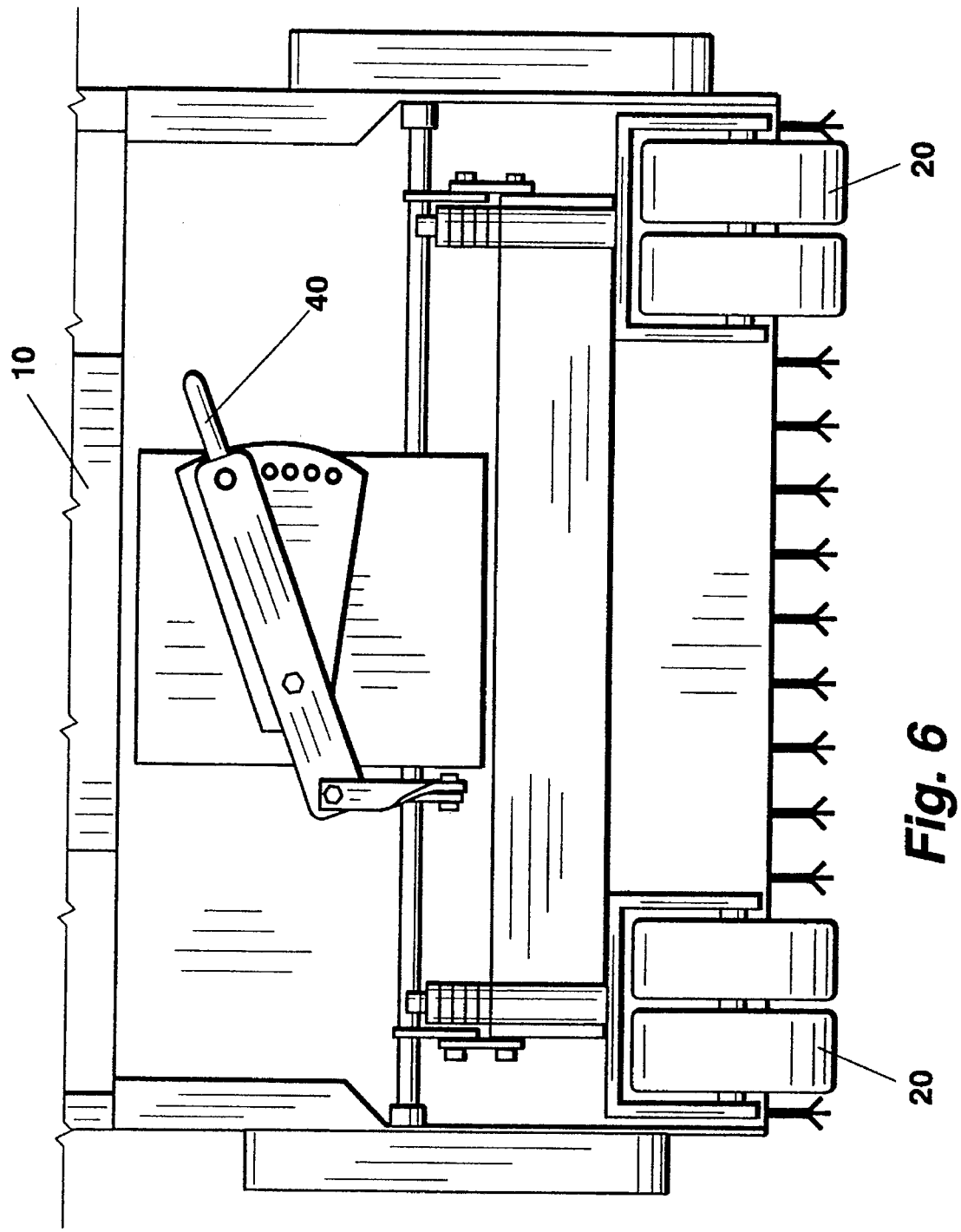
FIG. 6 is a front view of the bottom of the apparatus showing the mechanism used to adjust the height of the cut.

Since the rotation of the cutting assembly is opposite to the motion of the driving wheels, a safety cover typically of flexible yet sturdy materials is designed to be mounted over the front edge of the housing, such that any loose rocks or other debris not be discharged forward from in front of the machine during operation. Adjusting for the height of the cut is established by adjusting the front wheel supports which adjust the clearance between the cutting mechanism and the ground surface, as shown in FIG. 6. By moving the lever 40, both front wheels 20 cause to tilt the cutting assembly 18 supported by the enclosure 10, over the lawn, adjusting the height of the cut.

The cutting mechanism which comprises, the shaft, the blade supports and the blades is mounted on and contained within the apparatus frame or housing. As shown in FIG. 2 the housing cross-section about the cutting shaft assembly 50 is designed to curve around the cutting shaft with its blades extended radially and with an inner radius of curvature such that the space between the rotating blade tip and the inner surface of the housing is small, on the order of ¼ inches. The reason for the close tolerance is to provide an improved means for picking up the cut grass and thatch as well as provide for self-cleaning action to prevent accumulation of grass cuttings on the inside of the cutting shaft housing. The grass cuttings are designed to flow up and over the cutting shaft assembly and into a containment means 51. A flapper or barrier 52, may be manually moved to open or close the grass holding container. This flapper is controlled from the handle 53 of the apparatus.

Whereas, the present invention has been described in relation to the drawings attached hereto, it should be understood that other and further modifications, apart from those shown or suggested herein, may be made within the spirit and scope of this invention.

What is claimed:

1. A combination lawn mowing, de-thatching, mulching and gathering apparatus, designed to be moved by propulsion means mounted on said apparatus, comprising:

a housing having means to be movable over the lawn or field of grass, the housing extending transverse to the direction of travel and having a front end, a rear end, opposed right and left sides and opposed top and bottom;

a handle means attached to said housing for controlling said apparatus with control means mounted to said handle means;

a powering means mounted on said housing with control means to move said apparatus across the lawn or field of grass;

an elongated cylindrical horizontally positioned cutting assembly supported by said housing and rotatable about an axis, said cutting assembly comprising a rotatable shaft, a plurality of blade supports affixed to said shaft, disposable blade means mounted on said blade supports, said blade supports and said blade means being spaced longitudinally radially along said rotatable shaft in a predetermined pattern such as to cut a continuous swath as the rotatable shaft is rotated, said blade means including both mowing and de-thatching blades;

said plurality of blade support affixed to said rotatable shaft comprising four rows of longitudinally spaced blade supports along the length of said shaft and extending outward radially from said shaft, each of said four sets of longitudinally spaced blade supports being spaced equidistant radially about said axis of said rotatable shaft, and each of said longitudinally spaced individual blade supports being spaced equidistant from each other, and said blade supports on each of four sets of longitudinally spaced blade supports being offset such that they divide the space between said longitudinally positioned blade supports, each of said blade supports having a cylindrical pin at the radially outward end of said blade support, said pin axis being perpendicular to the blade support and parallel to said rotatable shaft axis, said pins providing the mounting means for said disposable blade means;

said disposable blade means comprising individual blades of rectangular shape with circular holes at one end for mounting on said blade support pins, and about which said blades may rotate, a cluster of said blades being mounted on each of said blade supports, said blade clusters comprising a center blade and inner blade, and an outer blade, said center blade extending radially outward from said blade support mounting pins of a length such that when rotating within the assembly its outer edge would reach and cut the thatch below the level of the grass, while said inner and outer blades are bent midway in their length outwardly from said straight center blade at opposing angles to said center blade, the edge of the bent portion of said blades cutting the grass as said cutting assembly rotates said disposable blade clusters forming an upside down Y shaped cutting blades and straight dethatching blades;

fastening means to maintain said disposable blade means on each of said blade support during operation, said fastening means allowing removal and replacement of said blade means from an entire row at one time;

an enclosure means in a generally cylindrical shape coaxial with and around the outer periphery of the cutting assembly and in close proximity to the outer cylindrical edge of the cutting assembly, with openings at the bottom and top of said enclosure means together with a means for controlling the top opening of said enclosure means, said enclosure means extending between and being supported by said housing sides; an elongated rearward shield member supported by said housing and extending between said housing sides, said rearward shield member extending tangentially from the top of the cylindrically shaped cutting assembly enclosure means to form the top of the lawn cuttings discharge opening;

a removable containment means supported by said handle means and said housing to receive and store the grass cuttings and lawn mulch; and means for rotating the cutting assembly.

2. A combination mowing, mulching and gathering apparatus as is claim 1 where the de-thatching blades have been removed.

3. A de-thatching apparatus as in claim 1 where the mowing blades have been removed.

4. An apparatus as in claim 1 where the means for controlling the top opening of the enclosure around the cylindrically shaped cutting assembly have been removed.

5. An apparatus as in claim 1 where the direction of rotation of the cutting assembly is opposite the direction of rotation of the wheels as said apparatus is propelled on the lawn.

6. A cutting assembly for use in a mower comprising a rotatable shaft, a plurality of blade supports affixed to said shaft, disposable blade means mounted on said blade supports, said blade supports and said blade means being spaced longitudinally radially along the length of said rotatable shaft in a predetermined pattern such as to cut a continuous swath as said rotatable shaft is rotated; said plurality of blade supports affixed to said rotatable shaft comprising four rows of longitudinally spaced blade supports along the length of said shaft and extending outward radially from said shaft, each of said four sets of longitudinally spaced blade supports being spaced equidistant radially about said axis of said rotatable shaft, and each of said longitudinally spaced individual blade supports being spaced equidistant from each other, and said blade supports on each of said four sets of longitudinally spaced blade supports being offset such that they divide the space between said longitudinally positioned blade supports, each of said blade supports having a cylindrical pin at the radially outward end of said blade support, said pin axis being perpendicular to said blade support and parallel to said rotatable shaft axis, said pins providing the mounting means for said disposable blade means;

said disposable blade means comprising individual blades of rectangular shape with circular holes at one end for mounting on said blade support pins, and about which said blades may rotate, a cluster of said blades being mounted on each of said blade supports, said blade clusters comprising a center blade and an inner blade, and an outer blade, said center blade extending radially outward from said blade support mounting pins of a length such that when rotating within the assembly its outer edge would reach and cut the thatch below the level of the grass, while said inner and outer blades are bent midway in their length outwardly from said straight center blade at opposing angles to said center blade, the edge of the portion of said blades cutting the grass as said cutting assembly rotates said disposable blade clusters forming an upside down Y shaped cutting blades and straight dethatching blades; fastening means to maintain said disposable blade means on each of said blade support during operation, said fastening means allowing removal and replacement of said blade means from an entire row at one time; and said individual blade means are fabricated of thin gauge, inexpensive metal banding material.

* * * * *